Oct. 14, 1958 R. L. BRADDOCK 2,856,159
WEED-FREE FENCE
Filed March 30, 1956 2 Sheets-Sheet 1
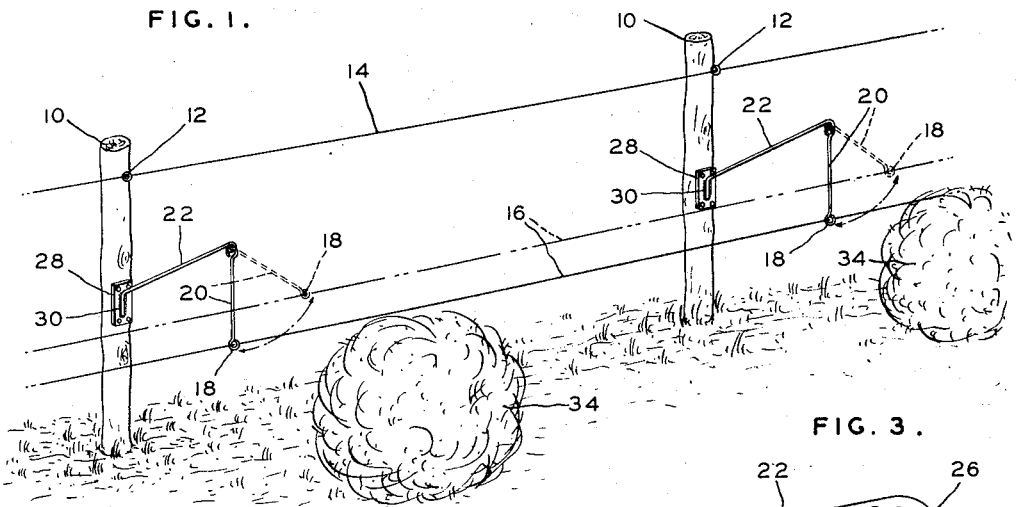
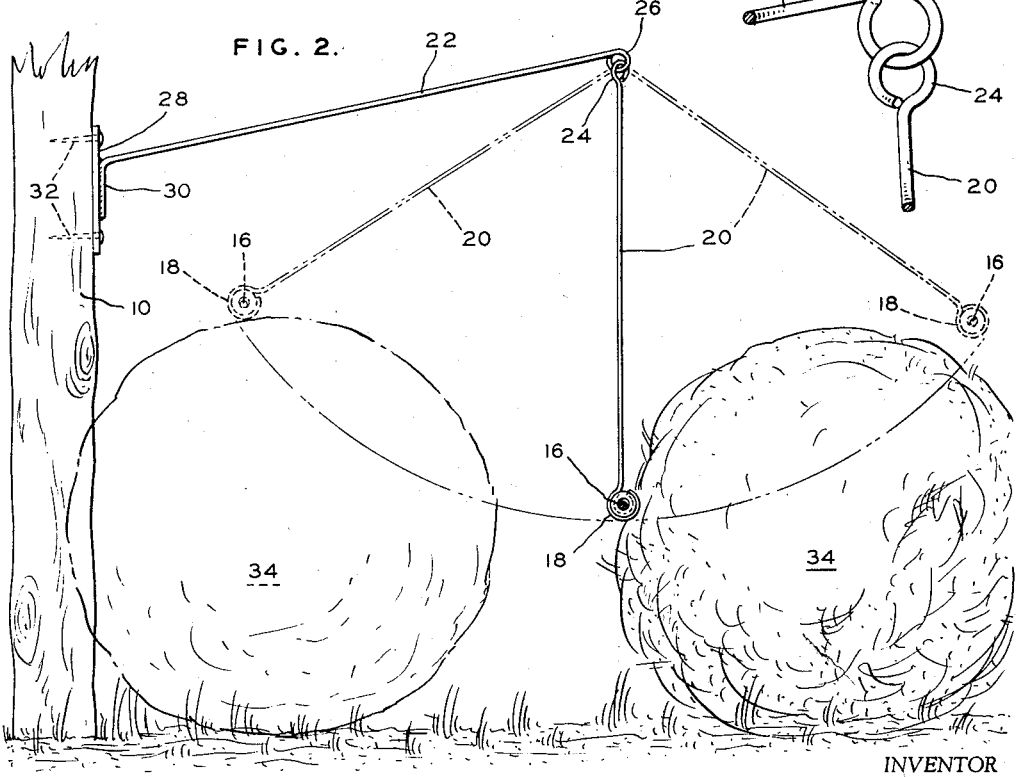
INVENTOR
ROBERT LEWIS BRADDOCK
BY Gustav Miller
ATTORNEY Oct. 14, 1958  R. L. BRADDOCK  2,856,159
WEED-FREE FENCE
Filed March 30, 1956  2 Sheets-Sheet 2
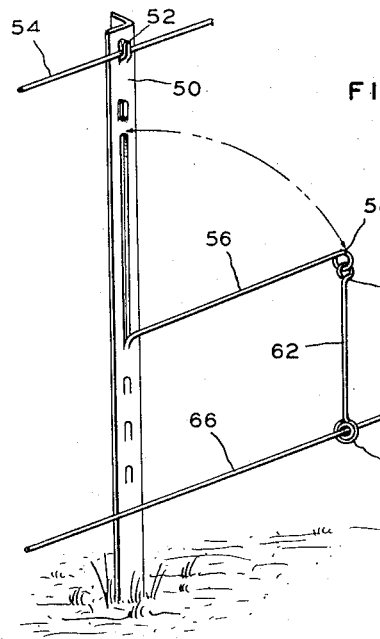
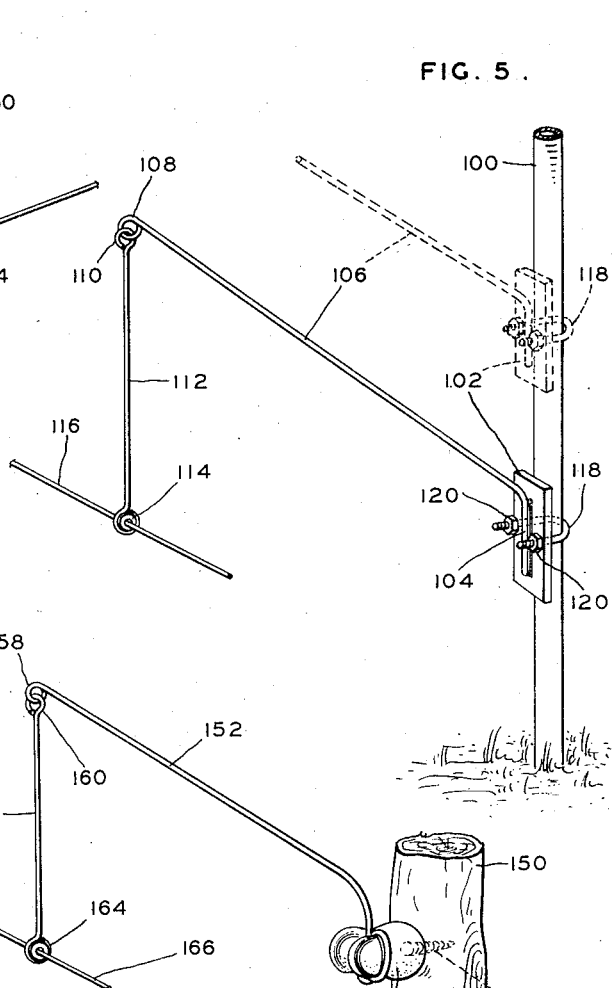
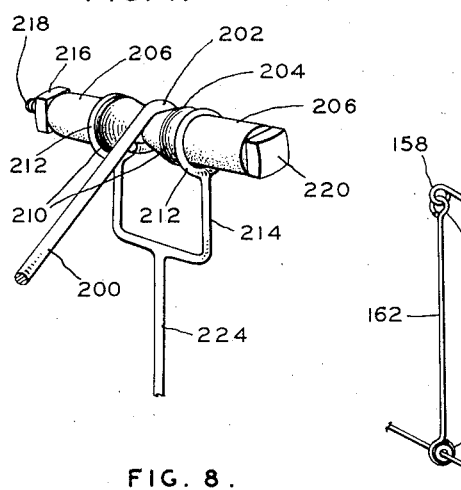
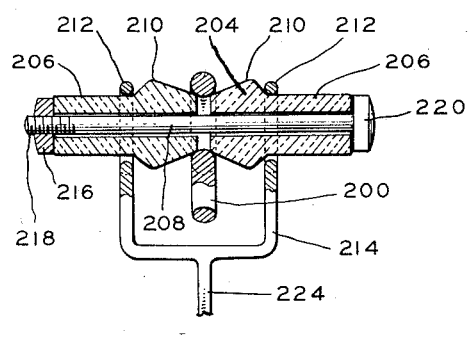
INVENTOR
ROBERT LEWIS BRADDOCK
BY Gustave Miller
ATTORNEY

United States Patent Office 2,856,159
Patented Oct. 14, 1958

2,856,159

WEED-FREE FENCE

Robert Lewis Braddock, Dodge City, Kans.

Application March 30, 1956, Serial No. 575,248

5 Claims. (Cl. 256—32)

This invention relates to wire fences, and it particularly relates to wire fences used in areas where tumble weeds are prevalent.

In many parts of the country, particularly in the western, mid-western and southwestern part of the country, the Russian thistle or, as it is more commonly called, the "tumble weed" causes extensive damage to fences. This weed is, on the average, two and one-half to three feet in diameter and when high winds blow, these weeds are blown loose from the ground and move with the winds. They often get lodged in fences and, if the winds are strong enough, tear the fences down. If the fence is sufficiently strong to resist this force, the weed which is lodged thereagainst forms the nucleus of a mound of dirt and dust in dry weather, or of snow in wet winter weather.

It is one object of the present invention to provide a fence which automatically clears itself of any entangling tumble weeds or the like.

Another object of the present invention is to provide a fence which is simple to construct and easy to maintain.

Other objects of the present invention are to provide an improved fence, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Fig. 1 is a perspective view showing a fence arrangement embodying the present invention.

Fig. 2 is an enlarged side elevational view of the assembly of Fig. 1.

Fig. 3 is an enlarged, detailed view of the hinge portion of the bracket of Figs. 1 and 2.

Fig. 4 is a perspective view of a second embodiment of the invention.

Fig. 5 is a perspective view of a third embodiment of the invention.

Fig. 6 is a perspective view of a fourth embodiment of the invention.

Fig. 7 is perspective, detailed view of an alternative form of hinge arrangement.

Fig. 8 is a cross-sectional view of the device of Fig. 7.

Referring now in greater detail to the drawings wherein similar reference characters refer to similar parts, there is shown in Figs. 1, 2 and 3 a fence assembly comprising a series of posts 10, two of which are illustrated. These posts, of ordinary wood or timber, are spaced apart in the ordinary manner and are each provided with a hook or eyelet 12 through which is strung the upper wire 14 of the wire fence.

The lower wire 16 of the fence is mounted between eyelets 18 which are positioned at the lower ends of rods 20 pivotally connected at their upper ends to rods 22. This pivotal connection is formed by a hook 24 on the rod 20 engaged with a hook or eyelet 26 on one end of the rod 22, as best seen in Fig. 3.

The opposite end of each rod 22 is welded, soldered, or otherwise rigidly connected to the face of a plate 28 by means of a bent portion 30. The plates 28 are adapted to be rigidly attached to the posts 10 by means of nails or screws 32 which extend through proper openings in the four corners of the plates.

If desired the height of the plates 28 on the posts, and consequently of the lower wire 16, may be adjusted by removing the nails or screws and re-attaching the plates at any desired position on the posts.

If the fence is electrified, the eyelets 18 for the lower wire and 12 for the upper wire, will be constructed of any ordinary electrical insulating material.

If during a windstorm, tumble weeds, such as indicated at 34, are blown against the lower wire 16, the force exerted by the wind-driven tumble weed acts to pivot the rods 20 on the rods 22, by means of the eyelets 24 and 26, thereby raising the lower wire to the dotted-line position shown in Figs. 1 and 2. In this position, the weed rolls on under the fence, after which the lower wire automatically moves down again into its gravity-biased normal position shown in full line in these figures.

In Fig. 4 there is shown another embodiment of the invention wherein instead of a series of wooden posts, the posts take the form of pre-fabricated posts made of metal, plastic or the like. Such a post is shown at 50 and takes the form of an angle iron having a hook 52 struck out from it adjacent the upper end. This hook 52 is adapted to hold the upper wire 54.

An arm 56 is also struck out from the center of the post and this arm is provided with an eyelet 58 at the free end thereof. Engaged with this eyelet 58 is the eyelet 60 at the upper end of a support arm 62. At the lower end of the arm 62 is provided an eyelet 64 for holding the lower wire 66.

If the fence is electrified, both the hook 52 and eyelet 64 are constructed of an electrical insulating material. If the post is constructed of a plastic material which is, itself electrically insulating, it is, of course, not necessary to use separate electrical insulating material for the hook and eyelet.

In Fig. 5 there is shown an embodiment of the invention wherein the posts can be either wooden, iron or similar round posts. There is illustrated an iron post of tubular structure, indicated at 100. The lower wire supporting structure comprises a plate 102, similar to plate 28, to which is connected the bent end 104 of a rod 106 having an eyelet 108 at its free end. Engaged with this eyelet is an eyelet 110 at one end of a support rod 112, a wire-supporting eyelet 114, which may be of electrical insulating construction. A wire 116 is supported in this eyelet.

All the above-described construction is similar to that of Fig. 5. However, the connecting means for the plate 102 differs from that for the plate 28 in that, instead of nails or screws, there is provided a U-shaped bracket 118, the front ends of which are threaded and which extend through corresponding openings in the plate to the front side thereof. Nuts 120 engage with the threaded ends of the U-shaped bracket and lock them against the front of the plate.

By loosening the nuts 120, the bracket 118 can be slid up and down along the length of the pole 100 and when in the desired position, the nuts can be tightened to clamp the plate 102 in the desired vertical position.

In Fig. 6 is shown yet another form of the invention wherein the posts are wood or timber, as indicated at 150. In this form of the invention, the rod 152 is connected to an electrical insulating connector 154 having a screw 156 extending therefrom. The connector is moved to the vertical position along post 150 as desired, and then the screw 156 is screwed into the wood. When it is desired to adjust the height of the wire fence, the connector 154 is unscrewed and then moved to the adjusted position where it is again screwed in place.

The rod 152 is provided with an eyelet 158 which engages with eyelet 160 on rod 162. The lower end of rod 162 is provided with eyelet 164, of electrical insulating material, if desired, which supports lower wire 166.

In Figs. 7 and 8 there is shown a modified form of pivot joint wherein the fixed rod 200 is provided with an eyelet 202 in which is supported an electrical insulating bar 204. The bar 204 actually comprises two separate portions or sleeves 206 mounted on a rod 208. The sleeves have inner heads 210 which serve to form an inner groove therebetween to support the eyelet 202. The outer edges of the heads space the eyelet portions 212 of a bracket 214 from the eyelet 202. The sleeves 206 are separately mounted on the bolt 208 by removing the nut 216 from the threaded end 218 of the bolt and then slipping thereover first one sleeve 206, then the eyelet 202 and then the second sleeve 206. The head 220 of the bolt acts as a stop at one end, while the nut 216 is threaded onto the bolt at the other end to hold the assembly in place. Then the eyelet portions of the bracket 214 are positioned in place.

The supporting arm 224 is integral with bracket 214 and serves to support the lower fence wire by an eyelet such as described above.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. In a wire fence having a series of vertical supporting posts fixed in the ground, a fixed laterally-extending arm extending from each post, a gravity-biased support arm pivoted at one end to each of said laterally-extending arms and having means at the opposite end for supporting a low wire, a low wire strung between said last-mentioned means, the pivotal means connecting each of said support arms to its corresponding laterally-extending arm comprising a bolt having oppositely disposed electrical insulating sleeves thereon, spacer heads at the inner ends of said sleeves, an eyelet formed on said laterally-extending arm clamped between said spacer heads by a nut threadedly engaged at one end of said bolt and a head on the opposite end of said bolt, and a bracket having opposite connecting portions, each positioned on the outer side of a corresponding spacer head around said sleeves, said bracket being connected to the support arm.

2. The supporting means of claim 1 wherein said post is provided with a plate to which the holding arm is rigidly connected.

3. The supporting means of claim 2 wherein said plate is releasably connected to said post by insertable means.

4. The supporting means of claim 2 wherein said plate is provided with a U-shaped bracket which slidably embraces said post, there being means for clamping said bracket in slidably adjusted position on said post.

5. The supporting means of claim 1 wherein said post is of angle-bar construction and wherein said holding arm is struck out from said post.

References Cited in the file of this patent

UNITED STATES PATENTS

| 2,574,052 | Metcalf | Nov. 6, 1951 |
| 2,626,304 | Telecky et al. | Jan. 20, 1953 |
| 2,735,883 | Larson | Feb. 21, 1956 |